UNITED STATES PATENT OFFICE.

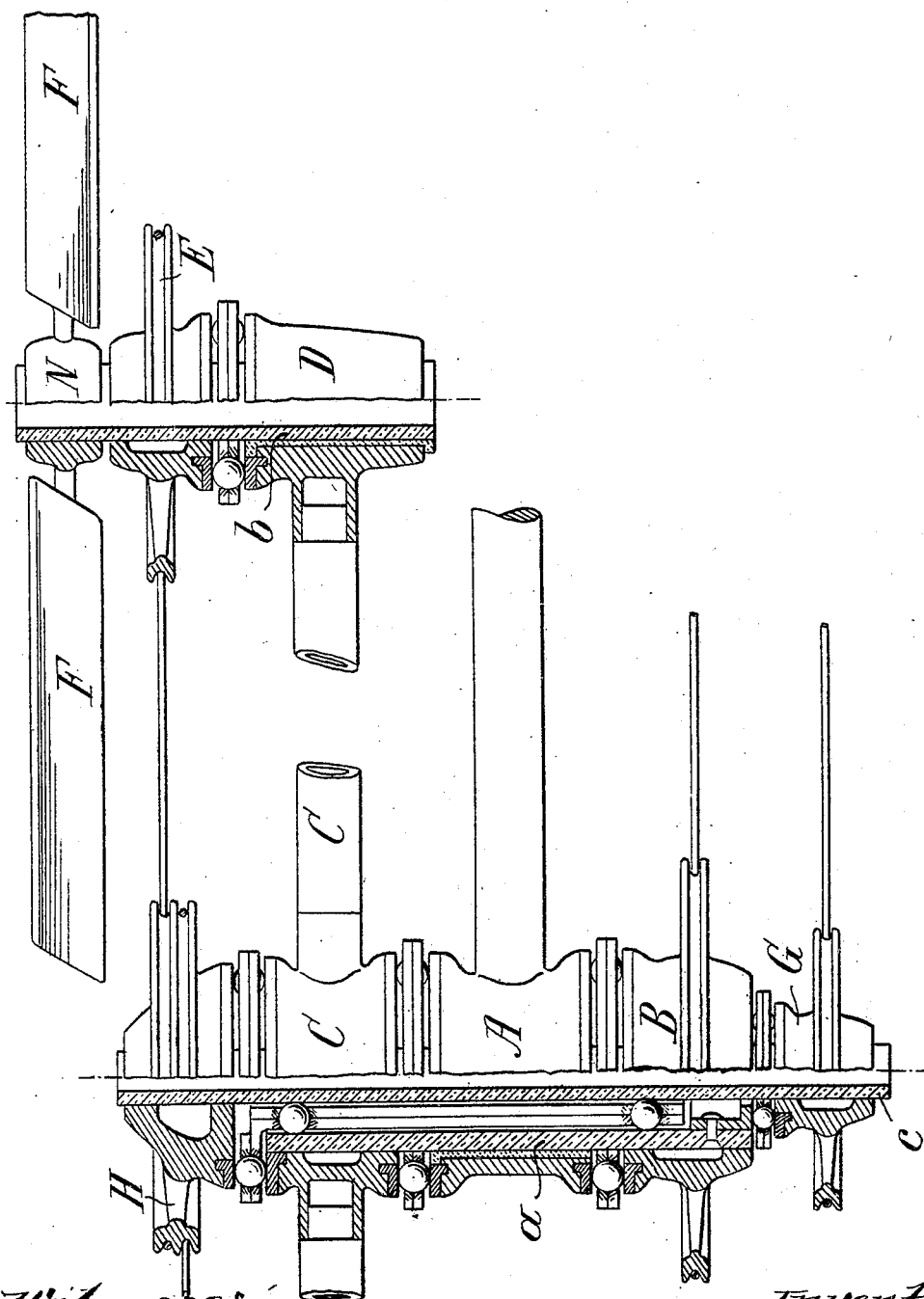

HERMANN HOERNES, OF LINZ, AUSTRIA-HUNGARY.

PROPELLING DEVICE FOR VEHICLES INTENDED FOR AIR, WATER, AND LAND LOCOMOTION.

No. 799,465.     Specification of Letters Patent.     Patented Sept. 12, 1905.

Application filed April 18, 1904. Serial No. 203,758.

*To all whom it may concern:*

Be it known that I, HERMANN HOERNES, a subject of the Emperor of Austria-Hungary, residing at Linz, Austria-Hungary, have invented certain new and useful Improvements in Propelling Devices for Vehicles Intended for Air, Water, and Land Locomotion, of which the following is a specification.

This invention relates to a propelling device for vehicles intended for air, water, and land locomotion; and its object is to obtain an increase of the useful effect by imparting to a rotating surface or a series of plane, curved, or screw-shaped rotating surfaces an increased speed of rotation, and consequently, also, an increased propelling or ascensive power. This result is achieved by causing the said surfaces to move in a planetary motion around a common axis, which is put in rotation simultaneously with the axis of the said surfaces, but with a speed differing from the speed of the latter axis, which may be driven independently by a special driving device (motor) or by a transmitting device from the said common axis.

The accompanying drawing represents, by way of example, such a device in a plan view and partly in section.

In a bearing A, which is a part of the vehicle to be moved, a hollow shaft $a$ is rotated by means of a driving mechanism B, a cord-pulley, or by a separate motor. This motion is transferred to the arm C, rigidly connected to the hollow shaft $a$, or to a double arm or to a system of arms. At the opposite end of this connecting-arm C is arranged a bearing D, in which a movable shaft $b$ is journaled. When the shaft $a$ is rotating, the shaft $b$ is caused to follow this motion—that is to say, to turn around the shaft $a$. Within the hollow shaft $a$ is located a second shaft $c$, which can be rotated from the driven shaft $a$, for example, by means of gearing devices or, as the case may be, in an independent manner by means of a special driving device, (motor,) but with a speed differing from that of the driven shaft $a$. This rotation of the shaft $c$ is transmitted, by means of a gearing or transmitting device H, to the shaft $b$. For this purpose a pulley E or the like is fixed to the shaft $b$. To a nave N on the shaft $b$ (or to several such naves) is attached a surface F or a system of such surfaces, which may be a plane or curved or oblique, or, if desired, it may also be screw-shaped. To this surface F a rotary motion can thus be imparted which will be independent of the rotation of the shaft $a$.

The speed of rotation may be chosen as it is thought proper. The rotations of the shafts may be interdependent, and this is achieved by means of the devices which transmit the motion, (cam, toothed wheel, cord-pulley, motor,) or these rotations are quite independent from one another, which may be attained, for instance, by separate electromotors each driving its pertinent shaft.

Between the separate shafts, the transmission devices, and the bearings are interposed special ball-bearings. In place of the latter may be used any other suitable antifrictional means.

Having thus described the invention, what is claimed as new is—

A propelling mechanism for a vehicle, consisting of a main bearing, a shaft rotatably mounted in said bearing and having driving mechanism connected thereto, and an arm rigidly projecting therefrom, an independently-driven shaft extending through the first-named shaft and having a speed of rotation imparted thereto differing from the latter shaft, a bearing attached to the opposite extremity of the arm and having a shaft projecting outwardly therefrom and parallel to the before-mentioned shafts, driving devices between the shaft within said hollow shaft and the shaft projecting outwardly from the bearing attached to the arm, and rotary propelling means held on the outer extremity of the shaft carried by the arm-bearing.

In testimony whereof I have hereunto set my hand in presence of two subscribing witnesses.

HERMANN HOERNES.

Witnesses:
   JOSEF RUBASCH,
   ALVESTO S. HOGUE.